Sept. 18, 1934. F. DU P. AMMEN 1,974,036
EASY PARKING AUTOMOBILE
Filed April 6, 1934 3 Sheets-Sheet 1

Inventor
Francis DuPont Ammen

Inventor
Francis DuPont Ammen

Sept. 18, 1934.  F. DU P. AMMEN  1,974,036
EASY PARKING AUTOMOBILE
Filed April 6, 1934  3 Sheets-Sheet 3
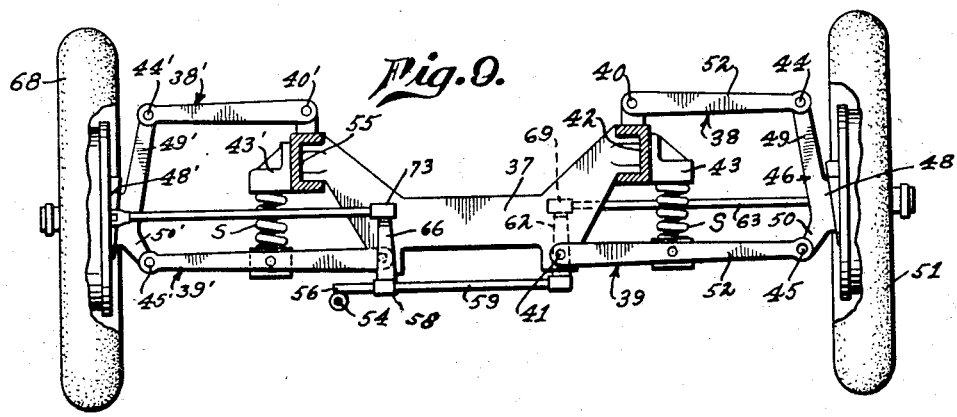
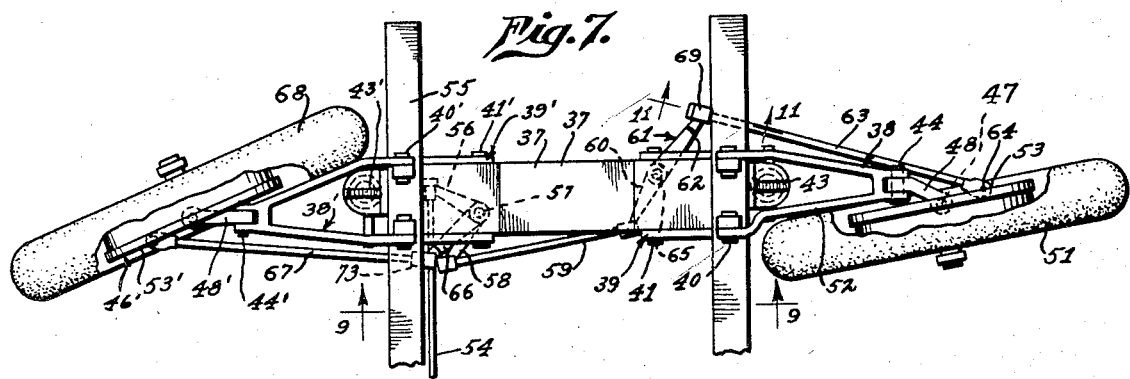
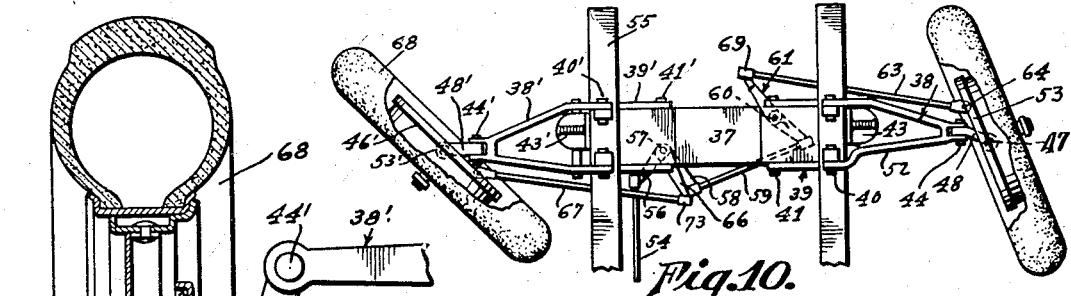
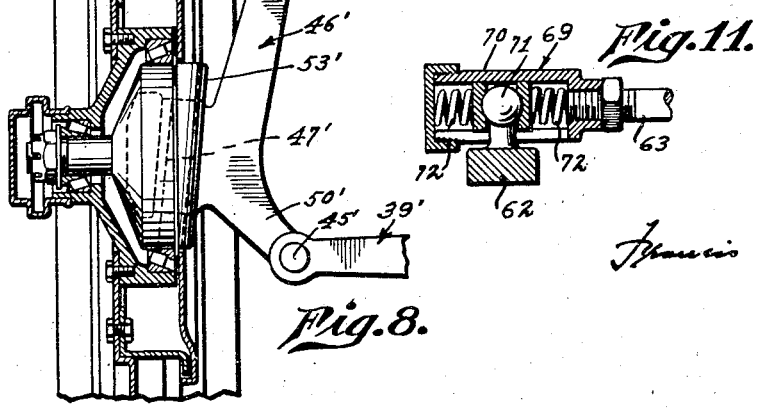
Inventor
Francis DuPont Ammen Patented Sept. 18, 1934

1,974,036

UNITED STATES PATENT OFFICE 1,974,036

EASY PARKING AUTOMOBILE

Francis Du Pont Ammen, Los Angeles, Calif.

Application April 6, 1934, Serial No. 719,341

26 Claims. (Cl. 280—95)

This invention relates to automobiles, and particularly to a construction to facilitate parking.

The general object of the invention is to provide a construction at the forward end of an automobile that will facilitate parking in a narrow space at a curb.

The invention is particularly applicable to cars of usual construction having a differential drive in the rear axle.

When parking such a car, equipped with my invention, the car should be backed in to the curb in an inclined position with respect to the curb line, and the front wheels are then swung to an extreme right position, as in making a sharp turn to the right. The drive of the car is then set for slow forward drive. The left rear wheel will then roll the front end of the car in to the curb. In my prior application, Serial No. 665,490, filed April 11, 1933, I disclosed a construction in which an increased swing was imparted to the left front wheel. The present invention in one aspect, may be regarded as an improvement of my prior construction. One of the objects of the present invention is to provide steering mechanism for connecting the front wheels that will operate to give the right front wheel an increased swinging angle, that is to say, an increased movement as compared with the simultaneous movement of the left front wheel. This facilitates parking in the manner described, using the forward drive to swing the car in to the curb instead of using the reverse drive as in my prior invention.

When the wheels have been swung to their extreme position toward the right for parking the car, the right front wheel will have been swung into a plane nearly at right angles to a radius line from the right rear wheel on which the car is to pivot in its swinging movement; and the left front wheel will have been swung through a less angle, approximately 65 degrees, so that it will lie in a plane substantially at right angles to a radius line to it from the right rear wheel. This necessitates the use of steering mechanism that gives an increased swinging movement of the right front wheel as compared with the left. This would naturally tend to produce inefficient steering of the car to the left when running on the roadway, because in steering to the left, the left wheel should swing through a greater steering angle than the right. One of the objects of this invention is to overcome this tendency and to provide a construction which will facilitate parking the car as described above in accordance with this invention, but which, in ordinary left steering on the road, will swing the left front wheel through a greater angle than the right front wheel.

A further object of this invention is to provide an improved construction for the front end of the car which will enable it to be parked as described above; and to attain this without necessitating changing the standard span between the side bars of the car frame; also to attain these objects by employing links and levers of common or standard type, such as now employed in standard steering gears.

Further objects of the invention will appear hereinafter.

The invention consists in the novel parts and combinations of parts to be described hereinafter, all of which contribute to produce an efficient easy parking automobile.

A preferred embodiment of the invention is described in the following specification, while the broad scope of the invention is pointed out in the appended claims.

In the drawings:

Figure 7 is a plan of the forward end of a chassis illustrating my invention applied to a type of automobile having "knee-action" wheels, that is to say, a wheel suspension that involves the use of an individual spring that permits the wheel to rise over a hump in the roadway without immediately raising the car frame. This view shows the wheels in position for parking.

Figure 8 is a vertical section at the axis of the wheel and further illustrating details of the construction, but for the left side of the car.

Figure 9 is a vertical cross-section on the line 9—9 of Figure 7 looking forward but showing the wheels in neutral position.

Figure 10 is a plan upon a reduced scale and indicating the angular relation of the wheels in ordinarily steering to the left.

Figure 11 is a fragmentary section on the line 11—11 of Figure 7 passing through a joint of the steering mechanism and illustrating a lost motion connection that adapts the steering mechanism to permit the independent free up-and-down movement of the wheels without straining the steering links.

Figure 2:
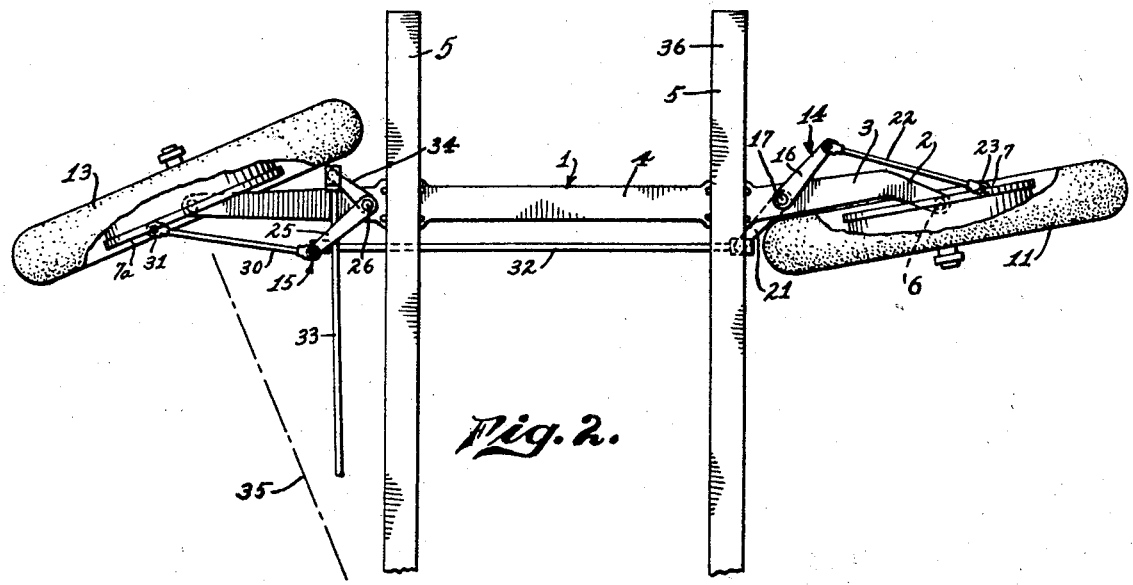
Figure 2 is a view similar to Figure 1, but showing the wheels in their extreme position for parking the car.

The car can be constructed for parking against a left-hand curb or a right-hand curb. This invention can be applied to a car of common construction having a transverse frame member in the form of a long front axle, and also to cars of a recent type having "knee-action" front wheels in which the front wheels have individual springs. Assuming that the car is of a type employing a front axle and assuming that the car is to be parked against a right-hand curb, I prefer to provide the right end of the front axle 1 with a rearwardly inclined wheel carrier or steering head 2 in the form of an end extension that is offset laterally in the axle so that it makes an obtuse angle with an inclined extension 3 projecting forwardly from the body 4 of the axle near the adjacent side frame bar 5. The end extension or steering head 2 is provided with means such as a king pin 6 (see Fig. 6) for mounting a knuckle head 7 on the axle for swinging movement on a nearly vertical axis. In order to give the wheel the proper camber and "toe-in", the steering head should be drilled or bored in an inclined direction to form a seat for this pin so that this pin would have substantially the same slight inclination from vertical as a regular king pin in standard practice.

The knuckle head 7 is of hollow cylindrical form, carries a main roller bearing 8 for supporting the wheel, and preferably has an arm 9 at its outer end to receive a steadying bearing 10 for the wheel 11. The plane of the wheel 11 is nearly in line with the axis of the king pin, but preferably displaced slightly in an outboard direction.

The axis of the king pin is preferably substantially in line with the longitudinal axis of the body 4 of the axle. The axle is, of course, preferably made in one piece. The rear edge of the extension 3 just clears the wheel in the extreme parking position of the wheel shown in Fig. 2.

The opposite wheel 13 is mounted on the other end of the axle by the same means as that already described, as to the wheel-bearing and king pin, but at that side it is unnecessary to form my angular bend in the axle.

The two wheels are connected by steering mechanism constructed of parts so related that in throwing the wheels to the right for parking, the right wheel 11 will move to a maximum angle of approximately 83 degrees (see Fig. 2), while the left wheel swings to a maximum angle of about 65 degrees. The mechanism for this purpose preferably comprises links and levers or arms. These links and levers are constructed like standard parts now used for ordinary steering gears.

For this purpose I provide actuating means 14 mounted on the axle at the right, and actuating means 15 mounted on the axle for the other wheel 13.

The actuating means 14 preferably comprises a lever 16 rigid on a long pin 17 that is loosely set in bosses 18 and 19 formed integrally with the axle. (See Fig. 5). The axis of this pin 17 is substantially parallel with the axis of the king pin 6. The pin 17 should have a head 20 that seats on the upper face of boss 18, and to this head, a lever 16 is rigidly attached. The lever 16 extends forwardly. A lower lever 21 rigid on the lower end of the pin 17 extends rearwardly. In the present instance these levers are diametrically opposite to each other on the pin.

The lever 16 is offset upwardly toward its outer end to bring its end up to approximately the level of the axis of rotation of the wheel and it is connected to the knuckle head 7 by a connecting member preferably in the form of a link 22. The lever 16 is relatively long so that the link 22 inclines rearwardly toward its outer end which is attached pivotally to a lug or lugs 23 on the inner face of the knuckle head 7.

Figure 5:
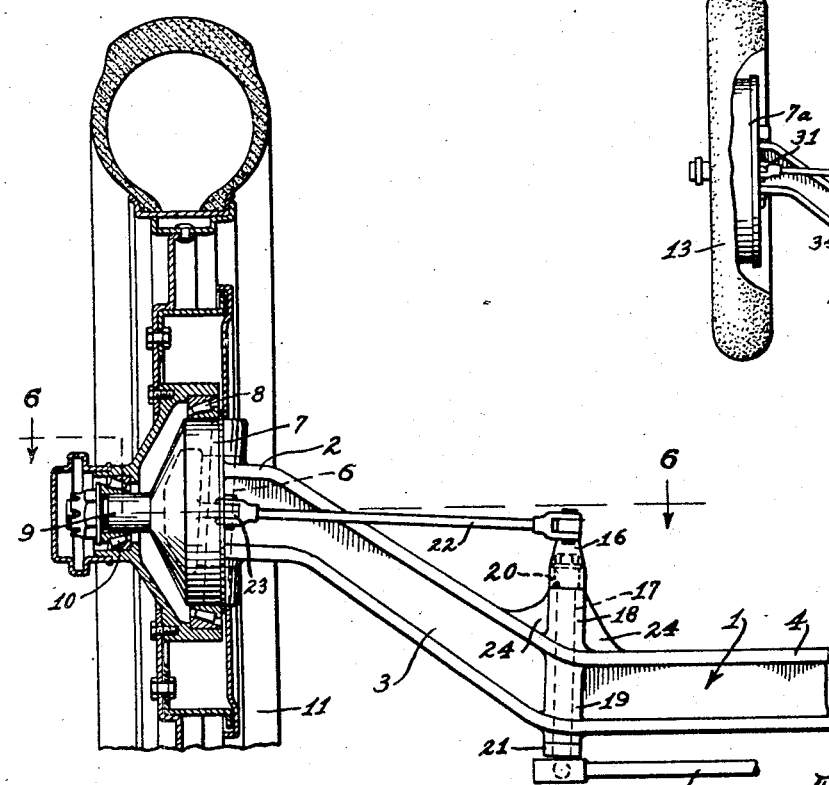
Figure 5 is a vertical section taken on the line 5—5 of Figure 1 looking toward the rear.

In practice the pin 17 is preferably set in a bushing not illustrated, and the upper boss should be stiffened by integral webs 24 formed on the axle (see Figure 5).

Figure 4:
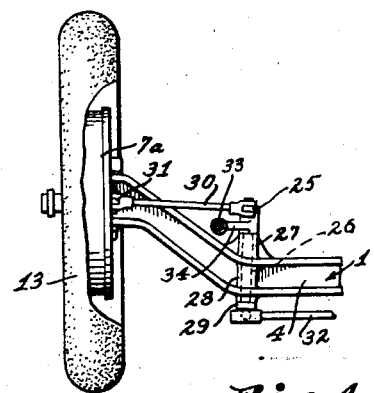
Figure 4 is a vertical section on the line 4—4 of Figure 1 looking toward the front with certain parts broken away.

The actuating means for the other wheel 13 comprises an upper lever 25 rigidly attached to a rocking pin 26 loosely mounted in bosses 27 and 28 formed integrally on the axle (see Fig. 4). The lower end of this pin is rigidly attached to a lever 29 below the axle. The lever 25 is pivotally connected by a connecting member or link 30 to the knuckle head 7ª, being connected to a lug 31 similar to lug 23. This link preferably inclines forwardly toward its outer end in the neutral position.

Suitable means is provided for connecting the actuating mechanisms 14 and 15 to enable the wheels to be swung in unison for ordinary steering and for parking purposes. In order to accomplish this, the levers 21 and 29 are connected by a cross link 32 which is located to the rear of the axle.

In order to control the steering mechanism from the usual steering wheel (not illustrated) a drag link 33 is provided, actuated by the steering wheel by usual means, and the forward end of this link is connected to an arm 34 that may be formed integrally with the lever 25, so that these levers 25 and 34 constitute a bell-crank lever.

In parking the car, it should be backed into the curb. Then by throwing the wheels to the position shown in Figure 2, and putting the car in low gear for forward movement, the car will swing around on a pivot point lying near the right rear tire as a center. In practice the design should be such that the radius line 35 from the left wheel will pass as near as possible to the tread point of the right rear wheel. When the car swings in as described, the right rear wheel will rotate very slightly in a forward direction, but it can not drive the right side of the car forward because it can not skid the wheel 11 sidewise. Therefore, substantially all the drive through the differential on the back axle will go to the left rear wheel, and will swing the car in to the curb with a movement that is substantially a rotation about a pivot near the right rear wheel.

In unparking the car, the front wheels are thrown to the position shown in Fig. 2, and the drive of the car is put into reverse. This will cause the left rear wheel of the car to move rearwardly and swing the car out from the curb.

It should be noted that the imparting of the comparatively increased swinging angle to the right forward wheel results from my lever and link system, in combination with the hollow knuckle heads 7 and 7ª, and the fact that the planes of the wheels are substantially in line with the axes of the king pins. This latter feature enables the wheels to swing without approaching bodily toward the side frames, and enables the side frame bars 5 to be spaced as in standard practice. In other words, the use of this steering gear necessitates no changes in the chassis of the car except at the front axle and wheels.

Figure 3:
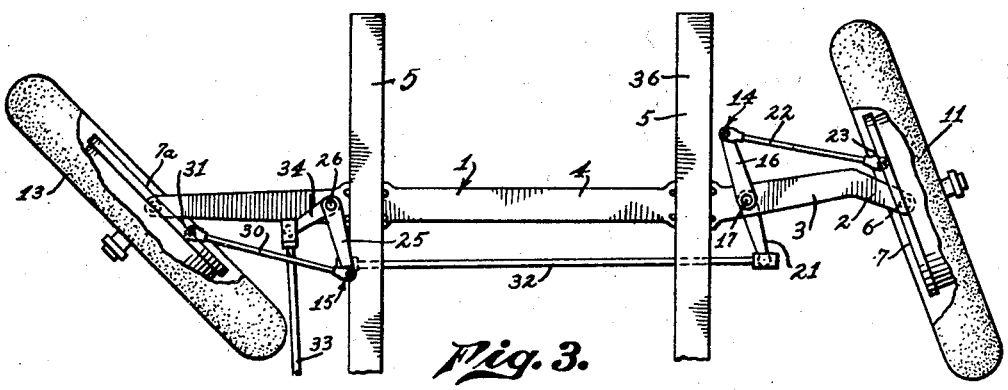
Figure 3 is a view similar to Figure 1 but showing the wheels in position for steering to the left as in running on a roadway.
Figure 1:
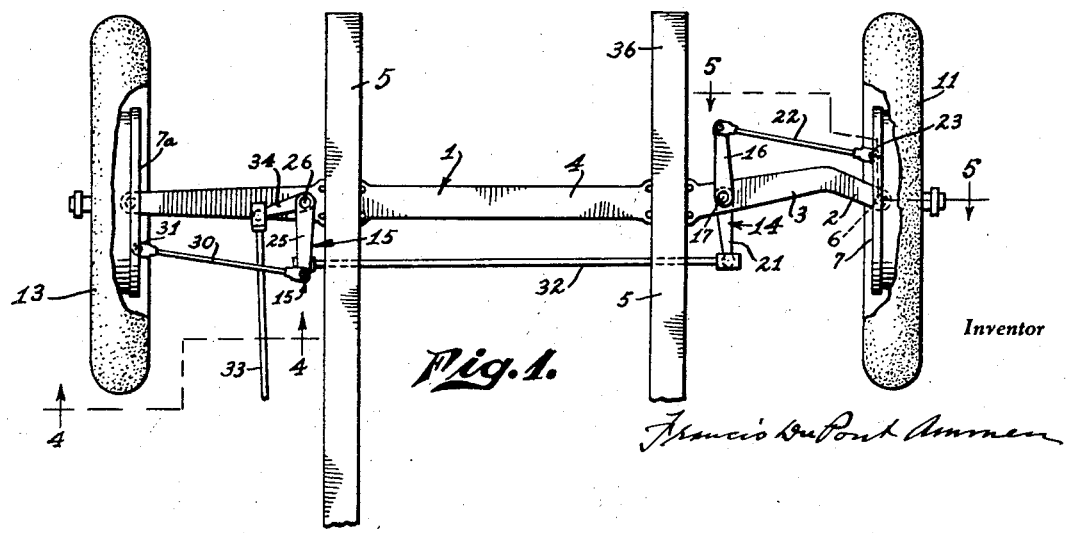
Figure 1 is a plan of the front end of a chassis with certain parts broken away, and illustrating my steering mechanism in its neutral position.

In regular steering toward the left, as in making a left turn on a roadway, this steering mechanism will give the left front wheel a relatively greater steering angle than the right wheel. This gives the car a short steering radius to the left. This is illustrated in Figure 3.

It will be noted also that in parking the car the lever 21 swings to the left, thereby giving clearance for the right wheel as its rear portion swings inwardly. The lever 34 at the other side of the car swings the drag link 33 away from the left wheel in regular steering to the left, thereby increasing clearance for that wheel.

The offset or bend at the right of the axle gives the increased clearance for the right wheel that enables it to swing through an angle of about 83 degrees, while the left wheel swings through about 65 degrees.

Attention is called to the fact that even when the right front wheel 11 is in its extreme parking position, as in Figure 2, the link 22 is nowhere near its dead center and still has a good "virtual lever arm" on the wheel. This insures that the steering mechanism will always work properly as regards this point.

The steering mechanism described above is intended for use in the United States and other countries where the rule of the road in driving is to "keep to the right." In countries such as England where the rule of the road is reversed, there the construction described above would be built "left-hand" instead of "right". In other words, the steering head 2 on the end of the axle would be on the left side and the parts would then be located with the arrangement they would have if the drawings were viewed from the back against a light.

In the neutral position of the steering mechanism the lever 34 inclines slightly to the rear toward its outer end.

A recent type of car has individual spring suspension for each of the forward wheels, popularly known as "knee-action" wheels. In this type of car the front axle may take the form of a transverse frame member or short axle 37. In Figures 7 to 11 I illustrate an adaptation of my invention to a car of this general type. The car illustrated is provided with two levers, namely a short upper lever 38 and a long lower lever 39. These levers are in the form of A frames as viewed in plan. At their inner ends they are pivotally mounted by pins 40 and 41 on the frame member 37. The lower lever 39 supports a spring S that thrusts upwardly against the under side of the frame member 37 or the side frame bar 42 through the agency of a side bracket 43 bolted or welded onto the main frame of the car. The outer ends of the levers 38 and 39 are pivotally attached by pins 44 and 45 to a steering head 46 carrying a nearly vertical king pin 47. The body portion 48 of this steering head (see Fig. 7) extends outwardly in a direction inclined with respect to the transverse axis of the car. In the present instance this inclination is toward the rear for right-hand parking and using forward drive to swing the car in to the curb.

Furthermore, the body portion 48 of the steering head comprises an upwardly extending long integral arm 49, carrying pin 44, and a short lower arm 50 carrying pin 45. The pins 44 and 45 are illustrated in vertical alignment with each other, but this is not essential provided the body portion 48 is inclined. By inclining it somewhat as shown, the side of the wheel 51 can lie in alongside the rearward bars 52 of the A frame levers 38 and 39.

Figure 6:
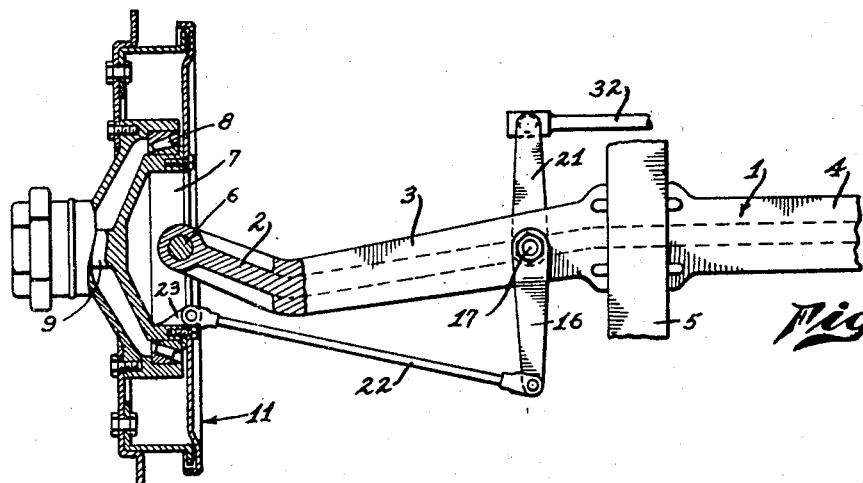
Figure 6 is a horizontal section taken on the line 6—6 of Figure 5.

The king-pin 47 mounts a knuckle head 53 on the steering head, similar to the knuckle head 7 shown in detail in Figure 6. In Figure 8 I illustrate this same type of construction for the opposite side of the car where the corresponding parts have prime reference numerals, for example, 47' indicates the king pin, 46' indicates the steering head. On that side of the car, however, the steering head 48' may project parallel with the transverse axis of the car, see Figure 7.

The lever arrangement for swinging the wheels is constructed on the same principle as that described in connection with Figures 1 to 6. But I may employ an inside location for the drag link 54, that is to say, it is located at the inner side of the left side frame 55, but below the same.

As illustrated in Figs. 7 and 9, the forward end of this link 54 is attached to an arm 56 mounted under the member 37 on a pin 57 and rigid with an arm 58 that is connected by a cross-link 59 to the rear arm 60 of a bell crank lever 61. This lever has a forwardly extending arm 62 that is offset upwardly toward its end, which end is connected by a link 63 to the knuckle head 53 by means of a pin 64. The bell crank lever 61 is pivotally attached to the under side of the transverse frame member 37 by a pin 65 located somewhat forwardly.

Referring again to the steering connections for the left side of the car, I provide an arm 66 that extends rearwardly and is offset upwardly at its end, which is connected by a link 67 to the knuckle head 53' for the left forward wheel 68.

The up-and-down movement of the wheel 51, in running along a roadway, may tend to strain the link 63. For this reason the inner end of this link may have a yielding lost-motion connection 69 such as illustrated in Figure 11. This comprises a slotted barrel or casing 70 receiving the ball 71 of the lever 62, which is held in mid position in the barrel 70 by means of two stout coiled springs 72 that thrust against the ends of the barrel. These springs require a greater force to compress them, than is developed in steering. Hence their presence does not interfere with the proper functioning of these parts in steering, but either of the springs can be compressed to give lost-motion and relieve strains in the link 63. A similar lost-motion connection 73 is provided at the inner end of link 67 for the same purpose.

Referring again to Figure 3, it may be observed that in the position shown for the left wheel, the link 30 is nearly on dead-center. In order to prevent any possibility of this wheel being thrown over too far in steering to the left, a stop of any kind may be provided at any point, for example, on the steering column, to limit the rotation of the steering wheel toward the left.

It is understood that the embodiment of the invention described herein is only one of the many embodiments this invention may take, and I do not wish to be limited in the practice of the invention, nor in the claims, to the particular embodiment set forth.

What I claim is:

1. In an easy parking automobile, the combination of a transverse frame member, a steering head supported thereby and extending rearwardly, a knuckle head, means for mounting the knuckle head on the steering head to swing on a substantially vertical axis, a wheel rotatably mounted on the knuckle head with the plane of the wheel nearly in line with said axis, a connecting member connected with the steering knuckle on the forward side of the transverse frame member for swinging the wheel, actuating means mounted on the transverse frame member, connected with said member and having a part located toward the rear of the transverse frame member, another knuckle head, means for mounting the same on the other end of the transverse frame member to swing on a substantially vertical axis, a connecting member connected with the last named knuckle head for swinging the same, actuating means mounted on the transverse frame member, connected with the last-named connecting member and having a part located toward the rear of the axle, a link connecting the said two actuating means toward the rear side of the transverse frame member, and means for imparting steering movement to one of said actuating means.

2. In an easy parking automobile, the combination of a transverse frame member, a steering head supported on the same and extending rearwardly at the side of the car, a knuckle head, means for mounting the knuckle head on the steering head to swing on a substantially vertical axis, a wheel rotatably mounted on the knuckle head nearly in line with said axis, a link pivotally attached to the knuckle head at the forward side of the transverse frame member, a lever pivotally supported on the transverse member and connected to the link, a second lever rigid with the last-named lever and extending rearwardly from the transverse frame member, a knuckle head adjacent the other end of the transverse frame member, means for mounting the same on the transverse frame member to swing on a substantially vertical axis, a wheel rotatably mounted on the last-named knuckle head, a link pivotally attached to the last-named knuckle head at the rear side of the transverse frame member, actuating means mounted on the transverse frame member and connected with the last-named link, a link connecting the said actuating means with the said second lever, and means for imparting steering movement to the above named parts.

3. In an easy parking automobile, the combination of a front axle, having a rearwardly inclined steering head at the right end of the axle, a knuckle head mounted on the steering head to swing on a substantially vertical axis, said axis lying substantially in line with the body of the axle, a wheel rotatably mounted on the knuckle head, a member located forward of the axle, and connected with the knuckle head at a point forward of the axle to swing the same, actuating means for said member, mounted on the axle, a knuckle head mounted on the left end of the axle to swing on a substantially vertical axis, means for connecting the said actuating means to the left knuckle head to swing the wheels in unison, and means for imparting steering movement to the above named parts.

4. In an easy parking automobile, the combination of a front axle having a steering head at its end extending rearwardly, a knuckle head, means for mounting the knuckle head on the steering head to swing on a substantially vertical axis at the end of the steering head, a wheel rotatably mounted on the knuckle head nearly in line with said axis, a lever pivotally mounted on the axle adjacent the knuckle head and extending forwardly, a link attached to said lever and pivotally attached at its outer end to the knuckle head forward of the axle, a knuckle head mounted on the other end of the axle to swing on a substantially vertical axis, a wheel mounted on the same, a lever pivotally supported on the axle adjacent the last-named wheel and extending rearwardly from the axle, a link connecting the last-named lever with the last-named knuckle head, means connecting said levers to swing in unison, and means for imparting steering movement to the above named parts.

5. In an easy parking automobile, the combination of a front axle having a steering head at its end extending rearwardly, a knuckle head, means for mounting the knuckle head on the steering head to swing on a substantially vertical axis at the end of the steering head, a wheel rotatably mounted on the knuckle head nearly in line with said axis, a lever pivotally mounted on the axle adjacent the knuckle head and extending forwardly, a link attached to said lever and pivotally attached at its outer end to the knuckle head forwardly of the axle, said link, in the neutral position, being inclined toward the axle at the outer end of the link, a knuckle head mounted on the other end of the axle to swing on a substantially vertical axis, a wheel mounted on the same, a lever pivotally supported on the axle adjacent the last-named wheel and extending rearwardly from the axle, a link connecting the last-named lever with the last-named knuckle head, said link, in the neutral steering position, inclining forwardly at its outer end, means connecting said levers to swing in unison, and means for imparting steering movement to the above named parts.

6. In an easy parking automobile, the combination of a front axle having a steering head at its end extending rearwardly, a knuckle head, means for mounting the knuckle head on the steering head to swing on a substantially vertical axis at the end of the steering head, a wheel rotatably mounted on the knuckle head nearly in line with said axis, a link connected to the knuckle head forward of the axle, a lever pivotally mounted on the axle, extending forwardly and attached to said link, a knuckle head mounted on the other end of the axle to swing on a substantially vertical axis, a wheel mounted thereon, a link attached to the last-named knuckle head to the rear of the axle, a lever pivotally mounted on the axle, extending rearwardly, a third lever rigid with the second lever and connected with the second-named link, means connecting the first and second-named levers to swing them in unison, and means for imparting steering movement to the above named parts.

7. In an easy parking automobile, the combination of a front axle having a steering head at its end extending rearwardly, a knuckle head, means for mounting the knuckle head on the steering head to swing on a substantially vertical axis at the end of the steering head, a wheel rotatably mounted on the knuckle head nearly in line with said axis, a frame bar supported on said axle, said axle beyond said frame bar having a forwardly inclined extension forming an obtuse angle with said steering head, a member connected with the steering knuckle on the forward side of the axle for swinging the wheel, actuating means mounted on the axle, connected with said member and having a part located at the rear of the axle, a knuckle head, means for mounting the same on the other end of the axle to swing on a substantially vertical axis, a member connected with the last-named knuckle head for swinging the same, actuating means mounted on the axle, connected with the last-named member and having a part located at the rear of the axle, a link connecting the said two actuating means on the rear side of the axle, and means for imparting steering movement to one of said actuating means.

8. In an easy parking automobile, the combination of a front axle having a steering head at its end extending rearwardly, a knuckle head, means for mounting the knuckle head on the steering head to swing on a substantially vertical axis at the end of the steering head, a wheel rotatably mounted on the knuckle head nearly in line with said axis, an actuating lever pivotally supported on the axle and extending forwardly from the same, a link connecting the actuating lever with said knuckle head, a knuckle head mounted on the other end of the axle to swing on a substantially vertical axis, an actuating lever therefor pivotally mounted on the axle and extending rearwardly, a link connecting the same to the last-named knuckle head, a wheel mounted on the last-named knuckle head, means for connecting said levers to swing in unison, said means cooperating with said levers and wheels to swing the first-named wheel through a greater angle than the second-named wheel when the wheels are swung to an extreme position toward the right to park the car.

9. In an easy parking automobile, the combination of a front axle having an inclined steering head formed at one end thereof, a wheel, a knuckle head pivotally mounted on the end of the steering head on a substantially vertical axis, carrying the wheel and cooperating with the inclined steering head to enable the wheel when parking the car, to swing in one direction through a relatively great steering angle, a wheel for the other end of the axle, means for mounting the same on the axle to swing on a substantially vertical axis, a link located on the side of the axle opposite to the side toward which the inclined steering head projects and connected to the knuckle head, means including a cross-link on the side of the axle toward which the inclined steering head projects for connecting the wheels so that when the first-named wheel swings through a great steering angle for parking the automobile, the other wheel will swing through a less angle than the first wheel, said mechanism cooperating with the wheels when the same are swung in the opposite direction, as in regular steering, to swing the second-named wheel through a greater angle than the first-named wheel.

10. In an easy parking automobile, a front axle having a bend at its right end so as to form a rearwardly inclined steering head at the axle's end, and having an inclined extension connecting the steering head with the body of the axle, a knuckle head pivotally mounted on the end of the steering head on a substantially vertical axis, and an actuating link located forward of the axle and attached to the knuckle head at a point forward of the axle.

11. In an easy parking automobile, the combination of a front axle, a knuckle head, means for mounting the knuckle head on the end of the axle to swing on a substantially vertical axis, a wheel rotatably mounted on the knuckle head nearly in line with said axis, a member connected to the knuckle head on the forward side of the axle for swinging the wheel, actuating means mounted on the axle, connected with said member and having a part located at the rear of the axle, a knuckle head, means for mounting the same on the other end of the axle to swing on a substantially vertical axis, a member connected to the last-named knuckle head for swinging the same, actuating means mounted on the axle connected with the last-named member and having a part located at the rear of the axle, a link connecting the said two actuating means at points located on the rear side of the axle, and means for imparting steering movement to one of said actuating means.

12. In an easy parking automobile, the combination of a front axle, a knuckle head, means for mounting the knuckle head on the end of the axle to swing on a substantially vertical axis, a wheel rotatably mounted on the knuckle head nearly in line with said axis, a link pivotally attached to the knuckle head on the forward side of the axle, a lever pivotally supported on the axle and connected to the link, a second lever rigid with the last-named lever and extending rearwardly from the axle, a knuckle head at the other end of the axle, means for mounting the same on the axle to swing on a substantially vertical axis, a wheel rotatably mounted on the last-named knuckle head, a link pivotally attached to the last-named knuckle head at the rear side of the axle, actuating means mounted on the axle and connected with the last-named link, a link connecting the said actuating means with the said second lever at points located to the rear of the axle, and means for imparting steering movement to the above named parts.

13. In an easy packing automobile, the combination of a front axle, a knuckle head mounted on the right end of the axle to swing on a substantially vertical axis, said axis lying substantially in line with the body of the axle, a wheel rotatably mounted on the knuckle head, a member located forward of the axle, and connected with the knuckle head to swing the same, actuating means attached to said member, mounted on the axle, and extending forwardly from the axle, a knuckle head mounted on the left end of the axle to swing on a substantially vertical axis, means including a link of fixed length extending substantially parallel with the axle and pivotally connected at its ends with the said actuating means and with the left knuckle head to swing the wheels in unison, and means for imparting steering movement to the above named parts.

14. In an easy parking automobile, the combination of a front axle, a knuckle head, means for mounting the knuckle head on the end of the axle to swing on a substantially vertical axis, a wheel rotatably mounted on the knuckle head nearly in line with said axis, a lever pivotally mounted on the axle at a point removed from said vertical axis adjacent the knuckle head, and extending forwardly, a link attached to said lever and pivotally attached at its outer end to the knuckle head forward of the axle, a knuckle head mounted on the other end of the axle to swing on a substantially vertical axis, a wheel mounted on the same, a lever pivotally supported on the axle adjacent the last-named wheel and extending rearwardly from the axle, a link connecting the last-named lever with the last-named knuckle head, means connecting said levers to swing the same in unison, and means for imparting steering movement to the above named parts.

15. In an easy parking automobile, the combination of a transverse frame member, a steering head, a knuckle head mounted on the steering head to swing on a nearly vertical axis, a wheel, means for rotatably mounting the wheel on the knuckle head with the plane of the wheel about in line with the said axis, means for connecting the steering head to the said transverse frame member to permit independent up-and-down movement of the wheel relative to the transverse frame member, an individual yielding means corresponding to the wheel for resiliently supporting the transverse frame member on the wheel, said steering head projecting outwardly at the side of the automobile in a direction inclined to the transverse axis of the automobile, and means connected to the knuckle head for swinging the wheel on said nearly vertical axis.

16. In an easy parking automobile, the combination of a transverse frame member, a steering head, a knuckle head mounted on the steering head to swing on a nearly vertical axis, a wheel, means for rotatably mounting the wheel on the knuckle head with the plane of the wheel about in line with the said axis, means for connecting the steering head to the said transverse frame member to permit independent up-and-down movement of the wheel relative to the transverse frame member, an individual yielding means corresponding to the wheel for resiliently supporting the transverse frame member on the wheel, said steering head being located at the right side of the car for right-hand parking and extending in a direction inclined rearwardly toward its outer end, and means connected to the knuckle head for swinging the wheel on said nearly vertical axis.

17. In an easy parking automobile, the combination of a transverse frame member, a steering head, a knuckle head mounted on the steering head to swing on a substantially vertical axis, a wheel, means for rotatably mounting the same on the knuckle head so that the plane of the wheel is substantially in line with the said vertical axis, levers pivotally connecting the steering head to the transverse frame to permit the steering head to swing up and down relative to the transverse frame member, an individual spring associated with the levers and yieldingly supporting the transverse frame member on the wheel, said steering head extending outwardly in a direction inclined to the transverse axis of the automobile, a link connected with the knuckle head for swinging it, a lever pivotally supported on the transverse frame member and connected with the link, and actuating means connected with the lever.

18. In an easy parking automobile, the combination of a longitudinal frame bar, a front axle attached to the same, said axle beyond said frame bar being inclined forwardly, a steering head extending rearwardly and forming the outer end of said axle, a nearly vertical bore in the outer end of the steering head, a knuckle head having a chamber on its inboard side receiving the steering head, a king-pin mounted in said bore and pivotally attaching the knuckle head to the steering head, and means connected to the knuckle head for swinging the same on the axis of the king-pin.

19. In an easy parking automobile, the combination of a steering head at the side of the automobile and disposed on a vertical plane inclined to the automobile frame, a knuckle head with a chamber therein, means for pivotally mounting the knuckle head on the outer end of the steering head to swing on a substantially vertical axis and with the steering head projecting into said chamber, a wheel with a hub having a relatively large bearing on the knuckle head and with the plane of the wheel substantially in line with the said axis, said inclined steering head and said knuckle head cooperating to enable the wheel on that side of the automobile to swing through an increased angle in one direction for parking the automobile, and means connected with the knuckle head for swinging the same on its axis.

20. In an easy parking automobile, the combination of a steering head with means for connecting the same to the automobile frame, said steering head lying in a plane inclined to said frame, a knuckle head having a chamber on its inboard side receiving the outer end of the inclined steering head, a nearly vertical king-pin located at the outer end of the steering head and connecting the knuckle head to the steering head, a wheel rotatably mounted on the knuckle head, and means connected with the knuckle head for swinging the same, said inclined steering head cooperating with the knuckle head to provide an increased unobstructed space to enable the wheel to be swung into a parking position through a greater angle in one direction than the other.

21. In an easy parking automobile, the combination of a front axle having a steering head projecting from the adjacent body portion of the axle on a rearwardly inclined line, a knuckle head, means for mounting the knuckle head on the outer end of the steering head to swing on a substantially vertical axis, a wheel with a hub having a relatively large bearing on the knuckle head with the plane of the wheel substantially in line with said axis, and means connected with the knuckle head for swinging the same on its axis, said rearwardly projecting steering head serving to provide a space between its outer end and the adjacent portion of the axle into which a portion of the wheel and knuckle head may be swung to increase the maximum steering movement of the wheel in one direction about said vertical axis.

22. In an easy parking automobile, a front axle comprising a body having its axis on a plane perpendicular to the side frame of the automobile, a king-pin at one end of the axle and disposed in said plane of the axle body, a portion of the axle between the king-pin and said body being offset and disposed out of said plane of the axle body and king-pin, whereby a part of a steerable wheel assembly associated with said king-pin may swing into the offset in an extreme steering position to substantially intersect said plane.

23. An easy parking automobile, comprising in combination, a steering head disposed to lie in a vertical plane inclined to the frame of the automobile, means for connecting the same to said frame, a knuckle head having a chamber on its inboard side receiving the outer end of the inclined steering head, a nearly vertical king-pin located at the outer end of the inclined steering head, connecting the knuckle head to the steering head, a wheel rotatably mounted on the knuckle head, and means connected with the knuckle head for swinging the same, the inclined disposition of said steering head serving to provide a space to receive a portion of the knuckle head or wheel to enable the wheel to be swung into a parking position through a greater angle in one direction than in the other, means for mounting a wheel at the other side of the automobile, and means for connecting said wheels to swing in unison, said frame including side frame bars for the automobile located between the inner edges of the wheels in their extreme parking position.

24. In an easy parking automobile, a front axle having its end bent to form an inclined steering head, the outer end of said steering head having an opening therethrough formed on a nearly vertical axis to receive a king pin for attaching a steerable wheel assembly, said axle adjacent said steering head being offset laterally so that the axis of said opening is substantially in line with the longitudinal axis of the axle, said offset providing a space into which a portion of said steerable wheel assembly may be swung in an extreme steering position, to increase steering movement thereof in that direction.

25. In an easy parking automobile, including a longitudinal frame, a front axle disposed in transverse relation to said frame, said axle having a section projecting from said frame and an outer end section lying in a vertical plane inclined to said frame and to said first mentioned section, the bend in said axle formed by the two sections serving to provide a space into which a steerable wheel may be swung in an extreme steering position.

26. In an easy parking automobile including a longitudinal frame, a front axle disposed in transverse relation to said frame, said axle having a section projecting from said frame and lying in a vertical plane inclined thereto, said axle having an outer end section lying in a vertical plane inclined to said frame in an opposite direction to said first-mentioned section, the bend in said axle formed by the two oppositely inclined sections serving to form a space into which a steerable wheel may be swung in an extreme steering position.

FRANCIS DU PONT AMMEN.